United States Patent [19]

Ahmadian et al.

[11] Patent Number: 5,409,036
[45] Date of Patent: Apr. 25, 1995

[54] ELECTROMAGNETICALLY OPERATED PNEUMATIC VALVE ASSEMBLY FOR AN ELECTRICAL CONTACTOR ACTUATOR

[75] Inventors: Mehdi Ahmadian, Lake City; Stephen M. Drabant, Erie; Jeffrey M. Powell, McKean, all of Pa.

[73] Assignee: General Electric Company, Erie, Pa.

[21] Appl. No.: 127,395

[22] Filed: Sep. 27, 1993

[51] Int. Cl.⁶ .............................................. F16K 31/10
[52] U.S. Cl. ................................. 137/549; 137/625.27; 137/625.65; 251/129.2
[58] Field of Search ............... 137/625.27, 625.65, 137/549; 251/129.2

[56] References Cited

U.S. PATENT DOCUMENTS

| | | | |
|---|---|---|---|
| 753,999 | 3/1904 | Mosher | 137/625.27 X |
| 2,148,703 | 2/1939 | Martin | 251/129.2 X |
| 2,934,090 | 4/1960 | Kenann | 137/625.27 X |
| 4,051,862 | 10/1977 | Haytayan | 137/625.27 |

FOREIGN PATENT DOCUMENTS

| | | | |
|---|---|---|---|
| 200253 | 3/1955 | Australia | 137/625.65 |
| 3143916 | 5/1983 | Germany | 251/129.2 |
| 911771 | 11/1962 | United Kingdom | 251/129.2 |

*Primary Examiner*—Robert G. Nilson
*Attorney, Agent, or Firm*—Jill M. Breedlove; Marvin Snyder

[57] ABSTRACT

A contactor assembly has a pneumatic actuator coupled in driving relationship with a contact arm for affecting opening and closing of at least one pair of contact tips and has a magnet valve coupled between a source of actuating air pressure and the pneumatic actuator. The valve includes an air inlet port, an air outlet port and an air exhaust port. Resilient valve seats are incorporated in the valve for sealingly engaging metallic seats on a separable valve stem. In one form, an integral filter assembly is incorporated in the valve to filter inlet air. In another form, an in-line filter is coupled to the inlet port for filtering air.

16 Claims, 2 Drawing Sheets

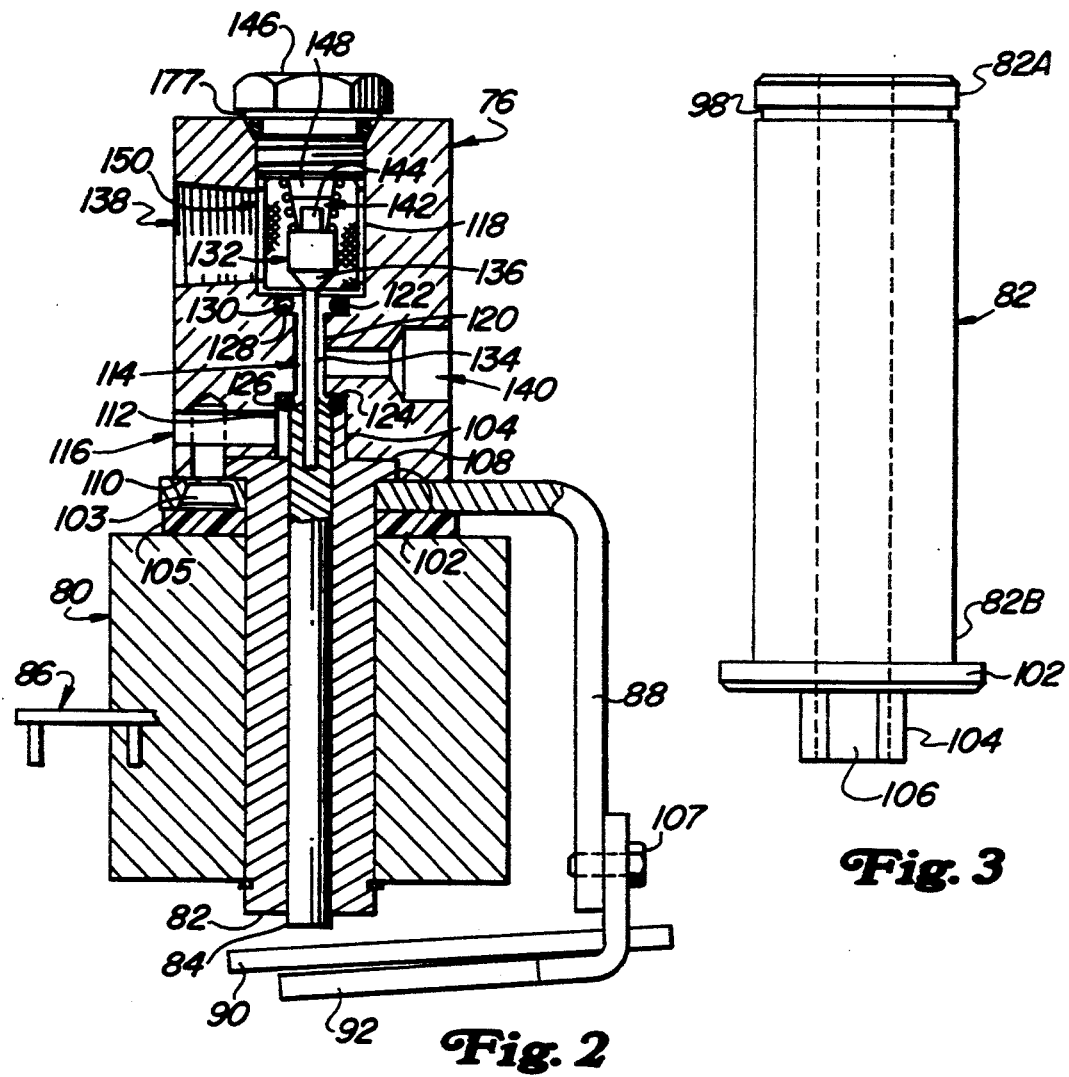
Fig. 2
Fig. 3
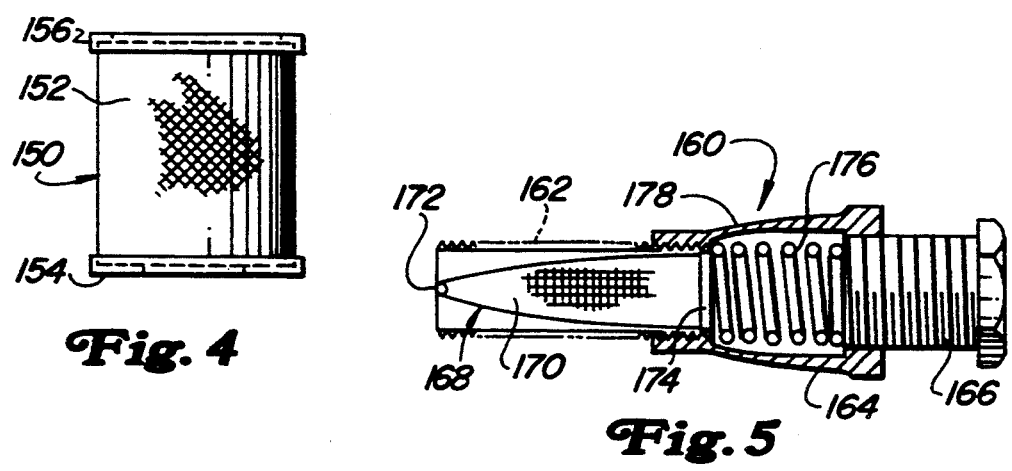
Fig. 4
Fig. 5

ELECTROMAGNETICALLY OPERATED PNEUMATIC VALVE ASSEMBLY FOR AN ELECTRICAL CONTACTOR ACTUATOR

BACKGROUND OF THE INVENTION

The present invention relates to electric circuit contactor systems and, more particularly, to an electromagnetically actuated pneumatic control valve for an electrical circuit contactor.

Traction vehicles such as locomotives, off-highway earth-moving vehicles and transit cars, are commonly powered by electric motors coupled in driving relationship to wheels and/or axles of the vehicles. Control of the electric motors requires an onboard electric power control system for supplying controlled electric power to the motors in response to an operator demand for horsepower or speed. Since the electric motors are typically high horsepower motors having operating current of as much as 1000 amperes and peak operating voltages of as much as 1000 volts, the control systems commonly use high voltage, high current contactors in several applications. Because it is desirable to open and close such contactors rapidly to minimize arcing and further because of the mass of the moveable contact portion of such contactors, it is common to utilize pneumatic cylinders or actuators for actuating such contactors. The pneumatic actuators require the use of control valves for controlling the application of air to the actuators.

One form of control valve used in traction vehicles is the "magnet valve". This valve is essentially an electromagnetic solenoid coupled to a pneumatic valve. The pneumatic valve is generally a three-port device having an air inlet port, an air outlet port for connection to an actuator and an air exhaust port for deeding air from the actuator. The valve may control air at a nominal 80 psia.

Pneumatic valves used in magnet valves have been taken from similar valves used in stationary installations. The application of these valves in traction vehicles places the valves in a relatively hostile environment, i.e., the air which is passed through the valve is generally contaminated with dirt or other debris. Further, the availability of an adequate air supply is limited and valves which are designed to "leak" must now provide better sealing so as to minimize air loss. With better seals, debris which was previously tolerated must be eliminated to protect the sealing surfaces.

SUMMARY OF THE INVENTION

Among the several objects of the present invention may be noted the provision of a magnet valve with improved sealing and reduced leakage and the provision of a magnet valve with integral filtering of debris from inlet air. In an illustrative form, the invention is incorporated in an electrical contactor control for a locomotive utilizing magnet valves for controlling operation of a pneumatic actuator for the contactor. The magnet valve includes a valve body having an air inlet port connected to a source of relatively high pressure air suitable for actuating the pneumatic actuator. An outlet port of the valve body is coupled to the actuator. The valve further includes an electromagnet having a coil encompassing a hollow core member. A valve stem extends through the core member and adjacent a moveable armature pivotably mounted at a first end of the electromagnet. At an opposite end of the electromagnet, the core member is formed with a radially outward extending flange spaced axially away from the adjacent end of the coil.

The valve body is coupled to the electromagnet by an L-shaped frame member having a first leg positioned between the valve body and coil with a slot in the leg which extends around the protruding end of the core and overlays the flange. The valve body has a recess for receiving the flange, which flange is pressed into the recess by attaching the frame leg to the valve body. A second leg of the frame extends around the coil towards the first end of the electromagnet with the armature pivotably mounted to the second leg at the first end. The valve stem extends through the hollow core and into the valve body.

The valve body is formed with an aperture extending through it and axially aligned with the hollow core of the coil. A first section of the aperture is at a first end of the body adjacent the core flange and has a diameter greater than the diameter of the valve stem. A second section of the aperture is at an opposite end of the valve body and also has an enlarged diameter. Between the first and second sections is a third section having a diameter less than that of the valve stem. A first valve seat is formed at the juncture of the first and third sections and a second valve seat is formed at the juncture of the second and third sections. Resilient seals are positioned on each valve seat.

The end of the valve stem in the valve body is conically shaped at a shallow angle for seating on the first valve seat. A valve stem extension extends from the valve stem through the third section and terminates in the second section in an enlarged diameter segment. The segment has a shallow angle conical shape facing the second valve seats and is spring biased toward the valve stem so as to normally seal the second section from the first and third sections of the aperture.

The inlet port opens into the second section of the aperture, the outlet port opens into the third section and the exhaust port opens into the first section. When the magnet valve is actuated, the valve stems seals at the first valve seat and forces the segment on the valve stem extension away from the second valve seat allowing air to flow from the inlet port to the outlet port and thus to the contactor actuator. When power is removed from the magnet valve, the valve stem extension pushes towards the coil sealing on the second valve seat while pushing the valve stem away from the first valve seat. Air then flows from the outlet port to the exhaust port allowing the contactor actuator to change state.

A filter assembly is operatively associated with the valve body for filtering air entering the valve body to protect the seals and the pneumatic actuator. In one form, the filter assembly is placed in the second section of the aperture and comprises a tubular shaped sieve having opposing end caps for support. One end cap has a central aperture for passing the valve stem extension segment. An open end of the second section is threaded for receiving an end cap for closing the second section and holding the filter in position. In another form, the seal assembly comprises an in-line assembly connected between the valve body and a source of actuating air. The in-line filter assembly includes a connector for insertion into the inlet port, a screen assembly positioned in the connector, a coupling attachable to the connector, a coil spring positioned in the coupling for restraining the screen assembly in the connector and an adapter threaded into the coupling and engaging the spring, the adapter having an inlet for connection to the air source.

BRIEF DESCRIPTION OF THE DRAWINGS

For a better understanding of the present invention, reference may be had to the following detailed description taken in conjunction with the accompanying drawings in which:

FIG. 2 is a cross-sectional view of the magnet valve of FIG. 1;

FIG. 3 is a detail view of a core member for use in the valve of FIG. 2;

FIG. 4 is a detail view of a filter assembly for use with the valve of FIG. 2; and FIG. 5 is a partial cross-sectional view of an alternate filter assembly for use with a magnet valve.

DETAILED DESCRIPTION OF THE PREFERRED EMBODIMENT

Figure 1:
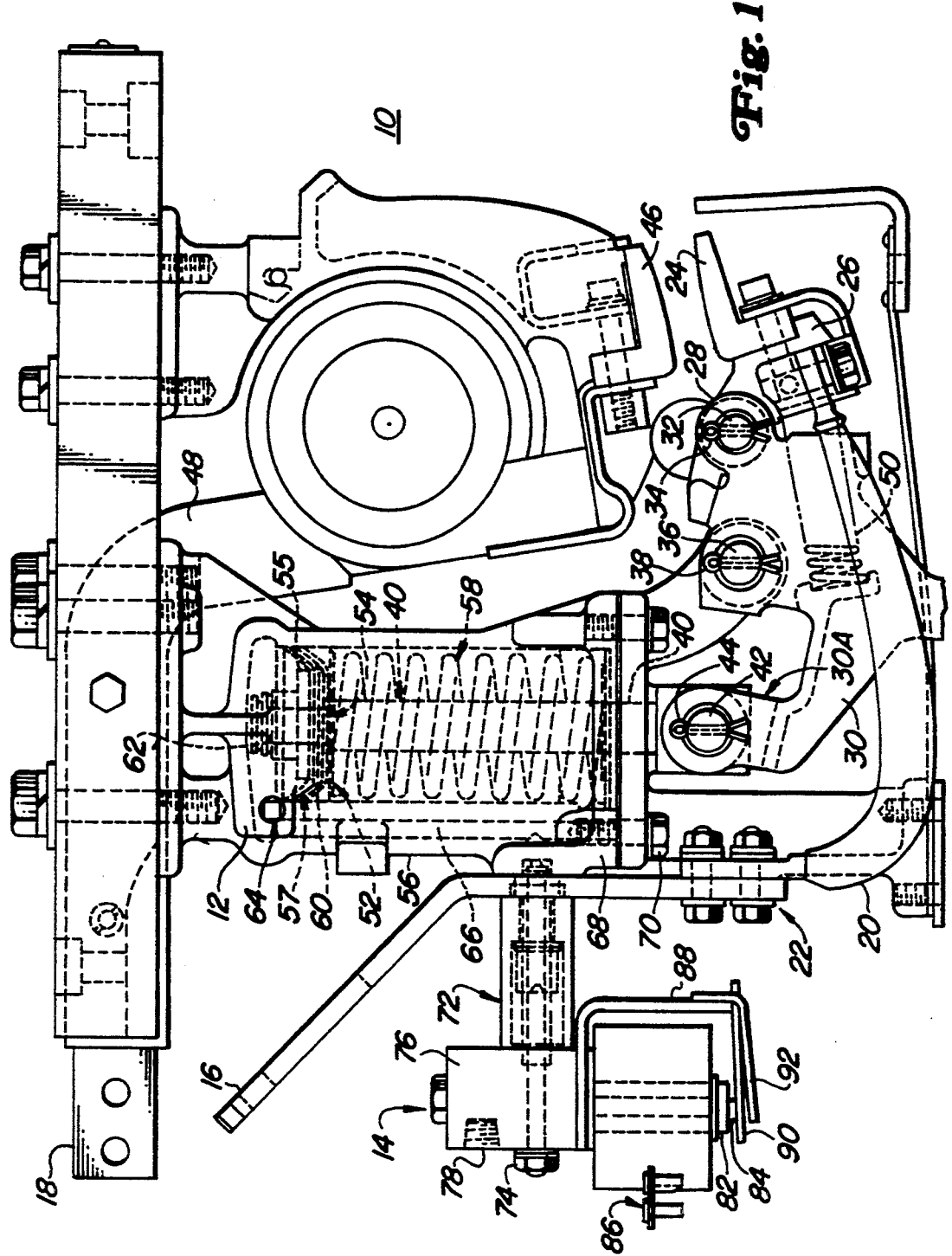
FIG. 1 illustrates an electrical contactor assembly operable from a pneumatic actuator under control of a magnet valve incorporating the teaching of the present invention.

Referring now to FIG. 1, there is shown a contactor assembly 10 employing a pneumatic actuator 12 whose operation is controlled by a magnet valve assembly 14. The contactor assembly 10 is characteristic of a class of high voltage, high current contactor assemblies typically used on electric traction motor vehicles for controlling the application of electric power at high current and high voltage levels to motor circuits and other equipment on such vehicles. The contactor assembly 10 has a pair of electrical terminals 16 and 18 which are connectable respectively to electric power cables or bus bars in the electric power system of the vehicle. The terminal 16 is insulatively mounted to the assembly and connects to a high current cable 20 via bolted connection 22. The cable 20 is coupled to a first contact tip 24 which is moveable by virtue of operation of the actuator 12. The contact tip 24 is connected through insulator 26 to a pivotable connection 28 on a contactor arm 30. The pivotable connection 28 may comprise a headed pin 32 passing through aligned openings in the insulator 26 and contact arm 30 with a cotter pin 34 passing through a hole in pin 32 for retaining the pin in the assembled position. The contactor arm 30 is also pivotably mounted to the contactor assembly at a pivot pin 36 similar to pivot pin 32 with a cotter pin 38 holding the pin 36 in position. Another end of the contact arm 30 is connected to a rod 40 extending from pneumatic actuator 12. The end of arm 30, indicated generally at 30A, is pivotably connected to the rod 40 by means of another pin 42 and retaining cotter pin 44.

As will be apparent, when rod 40 is actuated so as to move vertically downward as shown in FIG. 1, the contact arm 30 will pivot about the pin 36 causing the contact 24 to rotate counterclockwise towards a mating contact tip 46. Contact tip 46 is connected via cable 48 to terminal 18 so that closure of the contacts tips 24 and 46 allows current to flow between the terminals 16 and 18 through the contactor. The contact tip 24 is pivotably mounted to the contact arm 30 so as to affect a wiping action during making and breaking of the contact tips and prevent welding of the contact tips under high current conditions. The contact tip 24 pivots about the pin 32 and is generally held in position by a spring 50 positioned between contact arm 30 and insulator 26. A mechanical stop (not shown) prevents the contact tip 24 from being rotated about pin 32 any further than the position shown in FIG. 1. The actuator 12 comprises a pneumatic cylinder having an outer housing 56 enclosing an inner cavity containing a coil spring 58 surrounding the actuating rod 40 with a diaphragm 60 positioned above the coil spring and attached to the rod by compression against an upper end of spring 58 through a flat plate 52 by means of a nut 62 threadedly engaging the upper end of rod 40. The upper threaded end of rod 40 has a smaller diameter than the unthreaded portion thus forming a seat 54 for plate 52. A upper plate 55 spreads the force of nut 62 causing the oversized diaphragm 60 to have a concave outer periphery 57 to improve sealing. At the bottom of the housing 62, there is a passageway for passing the rod 40. Adjacent the top of the housing 56 there is an air inlet 64 which is connected via tubing 66 to the magnet valve 14. Magnet valve 14 is connected to a support bracket 68 which is bolted to the assembly 10 by bolts 70 adjacent the base of actuator 12.

The magnet valve assembly 14 includes a support block 72 which attaches to the bracket 68 by bolts 74 passing through apertures in valve body 76 and into threaded engagement with the bracket 68. In addition to the valve body 76, the magnet valve assembly 14 includes an electromagnetic coil 80 having a hollow center core member 82 of magnetic material and a nonmagnetic valve stem 84 passing through the hollow magnetic core 82. The coil includes a pair of electrical terminals 86 for supplying electric power to the coil for control of the magnet valve. The magnet valve assembly also includes an L-shaped frame member 88 having one leg positioned between the coil 80 and valve body 76 and another leg extending to a point adjacent the opposite end of the coil 80. A pivotable armature 90 is coupled to the frame 88 adjacent the other end of the coil 80 and held in that position by means of an armature guide 92.

When power is supplied to the coil assembly 80 of the magnet valve assembly 14, the magnetic field generated by the coil attracts the armature 90 to the core 82 causing it to press on the valve stem 84. When the valve stem 84 is depressed, it operates on the valve body 76 to allow air flow through the valve body, via an inlet port 78 through support block 72 and tubing 66 to the upper end of actuator 12. Air flowing in above the diaphragm 60 forces the diaphragm downward carrying the rod 40 with it and causing the contact arm 30 to pivot about pin 36. Pivoting motion of the contact arm 30 closes contact tip 24 against contact tip 46 to complete the electrical circuit.

Turning now to FIG. 2, there is shown a cross-sectional view of the magnet valve 14. In the magnet valve assembly 14, the coil 80 is formed with a central aperture through which the uniformly round, hollow, magnetic core 82 extends in sliding engagement. Referring briefly to FIG. 3, the core 82 includes a first end 82A having a circumferential slot 98 sized to accept a conventional snap ring 100 (FIG. 2). A second, opposite end 82B incorporates a radially outward extending circumferential flange 102 and a necked down extension 104 having a notch 106. Turning again to FIG. 2, the flange 102 fits into a mating recess 108 in a first surface 110 of valve body 76, although it is preferable that the depth of recess 108 be slightly less than the thickness of flange 102 so that flange 102 protrudes above surface 110. The extension 104 extends into a first enlarged diameter section 112 of an air passage 114 extending through valve body 76 and aligned axially with core 82. The outer circumferential surface of extension 104 slidingly engages the inner surface of section 112. When properly assembled, the notch 106 aligns with an air exhaust port 116 so that port 116 is not blocked by extension 104.

The air passage 114 terminates in another enlarged diameter section 118 at an opposite end of valve body 76. A third section 120 of passage 114 has a smaller diameter than either section 112 or section 118. Further, section 118 has a diameter greater than section 112 but includes an annular recess 122 circumscribing section 120 at its intersection with section 118, the recess 122 having about the same diameter as section 112. At the transition from section 112 to section 120, the diameter change creates a valve seat 124 on which is positioned a resilient seal 126. Similarly, at the transition from section 120 to recess 122, the diameter change creates another valve seat 128 on which is positioned another resilient seal 130. The seals 126 and 130 may comprise a conventional 0-ring of an elastomeric material such as, for example, rubber, neoprene or other polymer.

At the seal 126, the valve stem 84 is formed with a truncated conical shape, the angled sides of the cone forming an angle between about 50 and 65 degrees with respect to the elongate axis of the stem. These angles have been found to produce a good seal when stem 84 is urged against seal 126 by providing both a radial and axial pressure on seal 126 to seat the seal 126 on seat 124 with minimum radial force to prevent seal distortion. The truncated shape is created by a central aperture drilled into the valve stem 84 to a preselected depth. A valve stem extension member 132 has a reduced diameter portion 134 which extends loosely through passage 118 and slidingly engages the central aperture in valve stem 84 at one end. An opposite end of member 132 terminates in an enlarged diameter valve seat member 136. At the juncture with portion 134, member 136 is formed with the same conical shape as formed on the valve seat end of valve stem 84 so that member 136 can seat on seal 130. The depth of the central aperture in stem 84 and the length of extension member 132 are selected so that sealing at one of the seats 124, 128 results in an open passageway at the other of the seats. As is shown, valve body 76 has, in addition to exhaust port 116, an air inlet port 138 and an air outlet port 140. Port 138 opens into passage section 118 and port 140 opens into passage section 120. When valve stem 84 seats on seal 126, air inlet port 138 is coupled to air outlet port 140 through passage sections 118 and 120 via the open seal at extension member 132. Conversely, when member 132 seats on seal 130, air outlet port 140 is coupled to air exhaust port 116.

The extension member 132 is urged toward valve stem 84 by a conically shaped coil spring 142 having a small diameter end held in engagement with extension member 136. The extension member 136 has a small tip 144 which fits into spring 142 to prevent slippage of the spring from member 136. The outer end of passage section 118 is threaded for receiving a mating threaded plug 146 which closes the passage and concurrently compresses spring 142 against member 136. Plug 146 also includes a tip 148 for centering spring 142. A gasket 177 is used between the plug 146 and body 76 to seal air.

Valve body 76 is assembled to coil 80 by first positioning core member 82 with flange 102 in recess 108 with notch 106 aligned with exhaust port 116. Frame member 88 is then placed over core member 82, the member 88 having an aperture large enough for passing the core member main body but not flange 102. Screws 103 are used to couple frame member 82 to valve body 76 with the frame member pressing the flange 102 into recess 108. Since flange 102 is thicker than the depth of recess 108, the core member flange is pre-loaded against valve body 76. An elastomeric washer 105 is thereafter placed over core member 82 resting on a surface of frame member 88 opposite flange 102. The coil 80 is then assembled onto core member 82 and seated on washer 105. Coil 80 is pressed down, compressing washer 105 sufficiently to expose slot or groove 98 in core member 82. A snap ring 100 is inserted into groove 98 to retain the coil 80 in the assembled position. Valve stem 84 is slid into the passageway through hollow core member 82 and armature keeper or guide 92 is assembled with armature 90 and bolted to frame member 88 using screws or bolts 107.

A separate feature of the present invention is a filter assembly 150 which fits within passage section 118. Assembly 150 comprises a tubular sieve 152 preferably formed of a metal screen material of about number 30 mesh size using a wire diameter of about 0.012 inches. Each end of the sieve includes an annular end cap 154,156 (see FIG. 4), which caps maintain the sieve against radial collapse. The assembly 150 is sized axially so as to be seated between the plug 146 and a bottom of passage section 118. The annular end caps 152,154 allow passage of the extension member 136 and spring 142 therethrough. The filter assembly 150 removes debris drawn into the air system of the traction vehicle, such as a locomotive and prevents the debris from contaminating the seals in the valve body and from being injected into the actuator assembly 12 where such debris could damage the walls of cylinder 56 and result in failure of the contactor system 10.

In some applications, it is desirable to provide filtering of the valve inlet air prior to the air entering the valve. Such might occur, for example, in systems using prior art valves which do not include an integral filter assembly 150. The present invention includes, for such purposes, an in-line filter assembly 160 shown in partial cross-sectional view in FIG. 5. The assembly 160 includes a male connector 162 adapted for threaded engagement in inlet port 138. A female-to-female reducer coupling 164 threads onto connector 162 and a female-to-male adapter 166 threads into another end of coupling 164. A filter screen assembly 168 fits within connector 162. Assembly 168 comprises a tubular sieve 170 having an outlet end 172 pinched closed thus forming an approximate cone-shaped sieve. The inlet end of the sieve 170 is attached to an annular flange 174. A coil spring 176 is positioned in coupling 164 and has a diameter so as to engage the flange 174. The adapter 166 presses on an opposite end of spring 176 urging the spring into contact with flange 174. The spring 176 is selected to assure positive seating of the flange 174 against an inner flange of coupler 164 when adapter 166 is in an assembled, threaded position so as to prevent debris from bypassing assembly 168.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. A magnet valve comprising:

an electromagnetic coil having a central passageway adapted for receiving a hollow core and having a pair of electrical terminals adapted for connection to a controllable source of electric power, said core being fixedly positioned in said coil and having a first end extending outward from a first end of said coil;

a frame attached to said first end of said core, said frame having a portion extending generally about an outer surface of said coil to a second end opposite said first end of said coil;

a moveable armature pivotably coupled to said frame adjacent said second end of said coil, said armature being positioned for attraction to said second end of said core upon energization of said coil;

an air flow control valve attached to said frame adjacent said first end of said core and aligned axially with said core, said control valve including a housing having, in combination:

an air inlet port adapted for connection to a source of relatively high pressure air;

an air outlet port adapted for supplying air from said inlet port to an air controlled mechanism;

an air exhaust port adapted for exhausting air from said outlet port to external of said housing;

a central aperture passing through said housing and aligned axially with said core, said aperture having a first enlarged diameter section at a first end of said housing adjacent said core, a second enlarged diameter section adjacent a second end of said housing opposite said first end and a third reduced diameter section interconnecting said first and second sections, said inlet port being coupled to said second section, said outlet port being coupled to said third section and said exhaust port being coupled to said first section;

a first valve seat formed in said aperture at a transition from said first section to said third section;

a first resilient seal positioned on said first valve seat;

a second valve seat formed in said aperture at a transition from said second section to said third section;

a second resilient seal positioned on said second valve seat;

a valve stem extending through said hollow core and into said first section of said aperture in said valve housing;

means operatively associated with said valve stem for sealingly engaging said first resilient seal upon energization of said coil in reaction to said armature urging said valve stem toward said valve for coupling air from said inlet port to said outlet port;

a valve stem extension extending from said second section of said aperture through said third section and into engagement with said valve stem; and means operatively associated with said valve stem extension for sealingly engaging said second resilient seal upon de-energization of said coil for de-coupling said inlet port from said outlet port and concurrently coupling said outlet port to said exhaust port.

2. The magnet valve of claim 1 and including a filter assembly positioned in said second section of said aperture for filtering air entering said outlet port.

3. The magnet valve of claim 2 wherein said filter assembly comprises a generally tubular sieve having a pair of end caps for holding said sieve in a tubular configuration, at least one of said end caps having a central aperture for passage of said valve stem extension therethrough.

4. The magnet valve of claim 3 wherein said first and said second resilient seals each comprise an O-ring.

5. The magnet valve of claim 1 wherein said means operatively associated with said valve stem for sealingly engaging said seal comprises a conical taper formed on an end of said valve stem, said taper having an angle of between 50 and 65 degrees with respect to an axis of said valve stem.

6. The magnet valve of claim 3 wherein said sieve comprises a number 30 wire mesh.

7. The magnet valve of claim 3 wherein said second section of said aperture extends through said second end of said housing, and including cap means releasably connected to said second end for sealing said second section.

8. The magnet valve of claim 7 wherein said second section is threaded at least adjacent said second end, said cap being adapted for threading engagement in said second section.

9. The magnet valve of claim 1 and including a flange formed circumferentially about said first end of said core and displaced axially from said coil, a recess formed in a surface of said control valve housing for receiving said flange, and means for coupling said frame to said housing and capturing said flange in said recess for attaching said coil and core to said housing.

10. The magnet valve of claim 9 wherein said flange is formed with an axial thickness greater than a depth of said recess for establishing a pre-load condition between said frame and said housing.

11. An air flow control valve assembly for use with an electromagnetic actuator, the valve assembly comprising:

a valve body having an air inlet port adapted for connection to a source of relatively high pressure air, an air outlet port adapted for supplying air from said inlet port to an air controlled mechanism, an air exhaust port adapted for exhausting air from said outlet port to external of said valve body, and a central air passage passing through said housing, said passage having a first enlarged diameter section at a first end of said housing, said passage having a first enlarged diameter section at a first end of said housing, a second enlarged diameter section adjacent a second end of said housing opposite said first end and a third reduced diameter section interconnecting said first and second sections, said inlet port being coupled to said second section, said outlet port being coupled to said third section and said exhaust port being coupled to said first section;

a first valve seat formed in said passage at a transition from said first section to said third section, said first valve seat including a first resilient seal;

a second valve seat formed in said passage at a transition from said second section to said third section, said second valve including a second resilient seal;

a valve stem extending into said first section of said passage in said valve body for selectively sealingly engaging said first resilient seal for coupling air from said inlet port to said outlet port, said valve stem having a first end for sealingly engaging said seal comprising a conical taper formed on said first end and having an angle of between 50 and 65 degrees with respect to an axis of said valve stem;

a valve stem extension extending from said second section of said passage through said third section and into engagement with said valve stem, said valve stem extension having a seal engaging seat having a conical taper formed at an angle of between 50 and 65 degrees with respect to an elongate axis of said valve stem extension; and means operatively associated with said valve stem extension for selectively sealingly engaging said second resilient seal for decoupling said inlet port from said outlet port and concurrently coupling said outlet port to said exhaust port.

12. The air flow control valve of claim 11 and including apparatus for removing at least some debris larger than a predetermined size from air entering said inlet port, the apparatus comprising a first connector adapted for connection to the inlet port, a tubular screen assembly having a closed end and an open end, an annular flange attached to the open end and adapted for preventing the screen assembly from passing through the connector, a coupling attached to the connector and a coil spring positioned within the coupling and engaging the flange of the screen assembly, an adapter adjustably coupled to the coupling and having a surface for engaging the spring for urging the spring into contact with the flange, the adapter being connectable to a source of air whereby the air passes through the screen assembly before entering the magnet valve.

13. The apparatus of claim 12 wherein the connector comprises an externally threaded connector, the coupling comprises an internally threaded coupler and said adapter comprises a coupler having external threads for threadedly engaging said coupling and internal threads for connection to the air source.

14. The air flow control valve of claim 11 and including a filter assembly positioned in said second section of said passage for filtering air entering said outlet port.

15. The air flow control valve of claim 14 wherein said filter assembly comprises a generally tubular sieve having a pair of end caps for holding said sieve in a tubular configuration, at least one of said end caps having a central aperture for passage of said valve stem extension therethrough.

16. The air flow control valve of claim 12 wherein said first and said second resilient seals each comprise an O-ring.

* * * * *